United States Patent
Ishida

(10) Patent No.: US 8,159,714 B2
(45) Date of Patent: Apr. 17, 2012

(54) SELECTING AN IMAGE READING APPARATUS FROM A PLURALITY DISPLAYED IN CORRELATION WITH A PREVIEW IMAGE ACQUIRED BY EACH APPARATUS

(75) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 607 days.

(21) Appl. No.: 12/421,897

(22) Filed: Apr. 10, 2009

(65) Prior Publication Data

US 2009/0257097 A1    Oct. 15, 2009

(30) Foreign Application Priority Data

Apr. 15, 2008    (JP) .................................. 2008-105789

(51) Int. Cl.
*H04N 1/04* (2006.01)
*H04N 1/32* (2006.01)
*G06F 3/05* (2006.01)
*G06F 15/16* (2006.01)
*G06K 9/20* (2006.01)

(52) U.S. Cl. ........ 358/1.6; 358/1.15; 358/527; 358/408; 358/474; 382/319

(58) Field of Classification Search .............. 358/1.1, 358/1.6, 1.13, 1.15, 1.18, 504, 527, 537, 358/406, 408, 474, 442, 450, 452; 382/318, 382/319; 715/273, 274; 345/629, 632, 634, 345/636

See application file for complete search history.

(56) References Cited

U.S. PATENT DOCUMENTS

| | | | |
|---|---|---|---|
| 5,935,217 A | 8/1999 | Sakai | |
| 7,782,499 B2 * | 8/2010 | Byun | 358/474 |
| 7,826,091 B2 * | 11/2010 | Horiuchi | 358/1.15 |
| 7,911,638 B2 * | 3/2011 | Kashiwagi | 358/1.1 |

FOREIGN PATENT DOCUMENTS

| | | |
|---|---|---|
| JP | 8-6884 A | 1/1996 |
| JP | 2000-92311 A | 3/2000 |
| JP | 2003-174537 A | 6/2003 |
| JP | 2006-197412 A | 7/2006 |
| JP | 2007-74642 A | 3/2007 |

* cited by examiner

*Primary Examiner* — Scott A Rogers
(74) *Attorney, Agent, or Firm* — Canon USA Inc IP Division

(57) ABSTRACT

A selection method, in an information processing apparatus connected to a plurality of image reading apparatuses, for making a selection from the plurality of image reading apparatuses, includes the steps of searching for the connected image reading apparatuses, performing a first displaying process to display the image reading apparatuses detected in the searching step, performing pre-scanning to acquire preview images from the respective image reading apparatuses detected in the searching step by controlling the image reading apparatuses, performing a second displaying process to display the preview images acquired in the pre-scanning step in such a manner that the preview images are correlated with the image reading apparatuses displayed in the first displaying process, and selecting an image reading apparatus based on the preview images displayed in the second displaying process.

12 Claims, 6 Drawing Sheets

UI OF APPLICATION 30

LIST OF CONNECTED APPARATUSES

| | R1 | R2 | R3 | R4 |
|---|---|---|---|---|
| MAC ADDRESS | 00.00.85.62.50.31 | 00.00.85.62.50.32 | 00.00.85.62.50.33 | 00.00.85.62.50.34 |
| PREVIEW IMAGE | CALENDAR 2006 OCTOBER | (schedule) | | |
| 53 — | ☑ ACQUIRE PREVIEW IMAGE | ☑ ACQUIRE PREVIEW IMAGE | ☑ ACQUIRE PREVIEW IMAGE | ☑ ACQUIRE PREVIEW IMAGE |
| STATUS OF APPARATUS | USABLE | USABLE | USABLE | USED BY ANOTHER USER OR APPLICATION |
| LAST USED DATE/TIME | 5/17/2006 17:15 | 9/1/2006 16:05 | NOT USED BEFORE | 2/21/2006 10:30 |
| 56 — | ☐ USE THIS APPARATUS | ☑ USE THIS APPARATUS | ☐ USE THIS APPARATUS | ☐ USE THIS APPARATUS |

57 — NEXT PREVIEW    PREVIEW ALL SIMULTANEOUSLY    59 — APPLY IMMEDIATELY    60

58 — END

FIG. 6

IMAGE READING APPARATUS OF SPECIFIED MAC ADDRESS HAS NOT BEEN USED BEFORE.

DO YOU REALLY WANT TO PERFORM PREVIEWING WITH THIS APPARATUS? IF SO, PRESS "APPLY IMMEDIATELY" BUTTON.

| CANCEL | APPLY IMMEDIATELY |

SELECTING AN IMAGE READING APPARATUS FROM A PLURALITY DISPLAYED IN CORRELATION WITH A PREVIEW IMAGE ACQUIRED BY EACH APPARATUS

BACKGROUND OF THE INVENTION

1. Field of the Invention

The present invention relates to a method of selecting an image reading apparatus, which a user wants to use, from a plurality of image reading apparatuses connected to an image processing apparatus.

2. Description of the Related Art

In one method of selecting an image reading apparatus from a plurality of image reading apparatuses connected via a network, a host computer searches for image reading apparatuses and displays an IP address or MAC address of each detected image reading apparatus so that a user is allowed to make a selection based on the displayed information. In this case, particular names may be given to respective IP addresses thereby making it possible for the user to make a selection by selecting a name. In another method, location information of image reading apparatuses on a network is presented to a user so that the user is allowed to make a selection based on the presented location information. In another method, in addition to IP addresses or MAC addresses, information as to performance such as a scanning speed, image quality, resolution, etc., of each image reading apparatus is presented for use in selection. In still another method, information indicating image reading apparatuses that satisfy a reading condition specified by a user is presented to the user thereby allowing the user to make a selection based on the presented information.

However, in the methods described above, it is necessary to manage location information, IP addresses, MAC addresses, or names assigned to IP addresses. If no management information is given, there is no measure based on which to select apparatuses, and thus it is difficult for a user to select an image reading apparatus to be used. In a case where a plurality of image reading apparatuses are of the same type having the same performance, performance cannot be a measure based on which to make a selection.

In view of the above, the present invention provides a method of selecting an image reading apparatus to be used even in a case where a user does not know the correspondence between the image reading apparatus and the IP address or the MAC address.

SUMMARY OF THE INVENTION

The present invention provides a selection method, in an information processing apparatus connected to a plurality of image reading apparatuses, for making a selection from the plurality of image reading apparatuses, comprising the steps of searching for the connected image reading apparatuses, performing a first displaying process to display the image reading apparatuses detected in the searching step, performing pre-scanning to acquire preview images from the respective image reading apparatuses detected in the searching step by controlling the image reading apparatuses, performing a second displaying process to display the preview images acquired in the pre-scanning step in such a manner that the preview images are correlated with the image reading apparatuses displayed in the first displaying process, and selecting an image reading apparatus based on the preview images displayed in the second displaying process.

Further features of the present invention will become apparent from the following description of exemplary embodiments with reference to the attached drawings.

BRIEF DESCRIPTION OF THE DRAWINGS

FIG. 4 is a diagram illustrating a user interface of an application.

FIG. 6 is a diagram illustrating a warning dialogue displayed when a new image reading apparatus is specified to be used.

DESCRIPTION OF THE EMBODIMENTS

Figure 1:
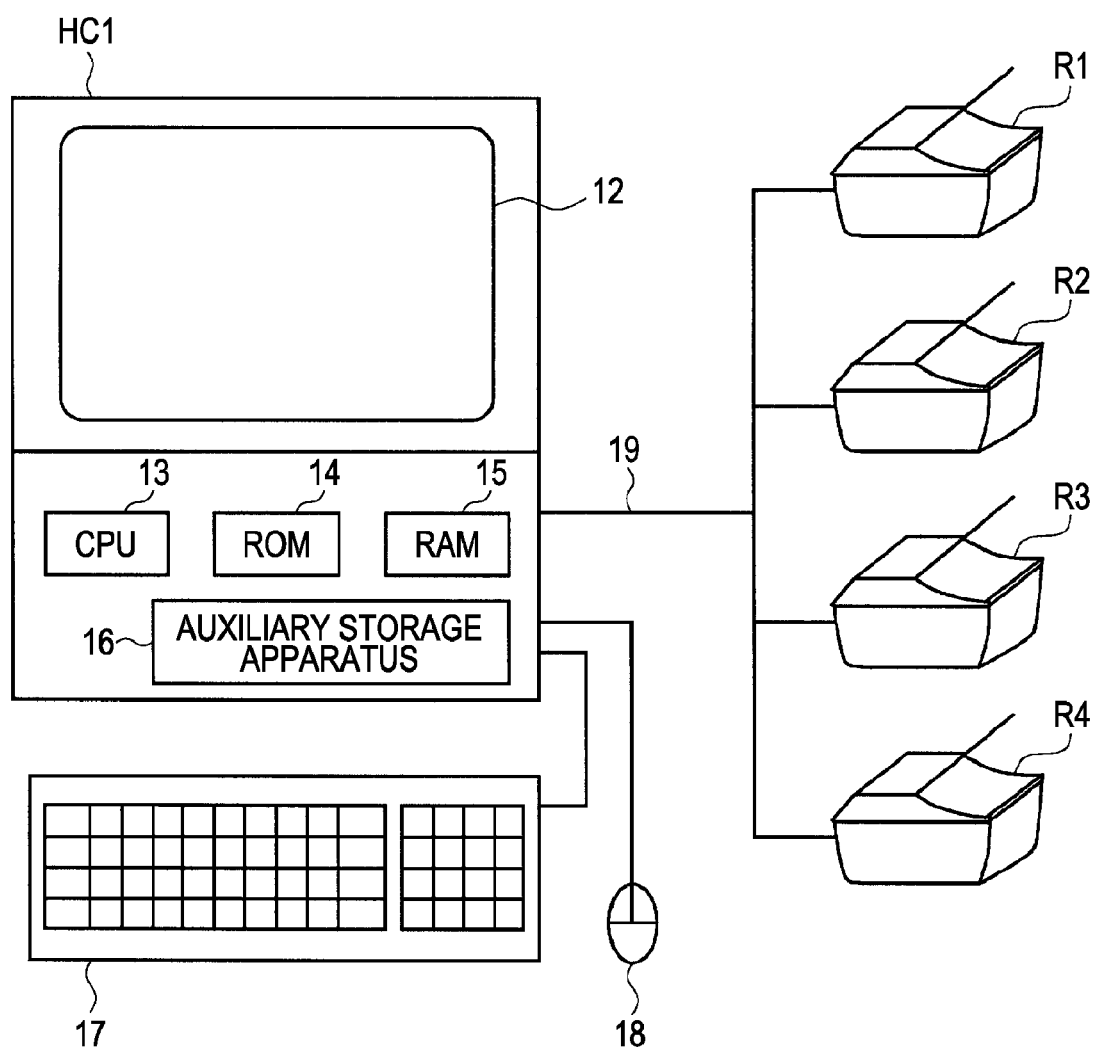
FIG. 1 is a diagram illustrating an information processing apparatus according to an embodiment of the present invention.

FIG. 1 illustrates an information processing apparatus 100 according to a first exemplary embodiment of the present invention. As shown, the information processing apparatus 100 includes a host computer HC1, a LAN 19, and image reading apparatuses R1, R2, R3, and R4.

The host computer HC1 issues an operation command to image reading apparatuses and acquires image data read by the image reading apparatuses. The host computer HC1 includes a monitor 12, a CPU 13, a ROM 14, a RAM 15, an auxiliary storage apparatus 16, a keyboard 17, and a mouse 18.

The monitor 12 displays a user interface (UI) of an application or a driver and also displays an execution status. The CPU 13 executes an application and a driver. The ROM 14 stores basic software such as BIOS. The RAM 15 temporarily stores software such as the application or the driver and associated data. The auxiliary storage apparatus 16 is a hard disk or the like.

The host computer HC1 is connected to the image reading apparatuses R1, R2, R3, and R4 via the LAN 19.

Figure 2:
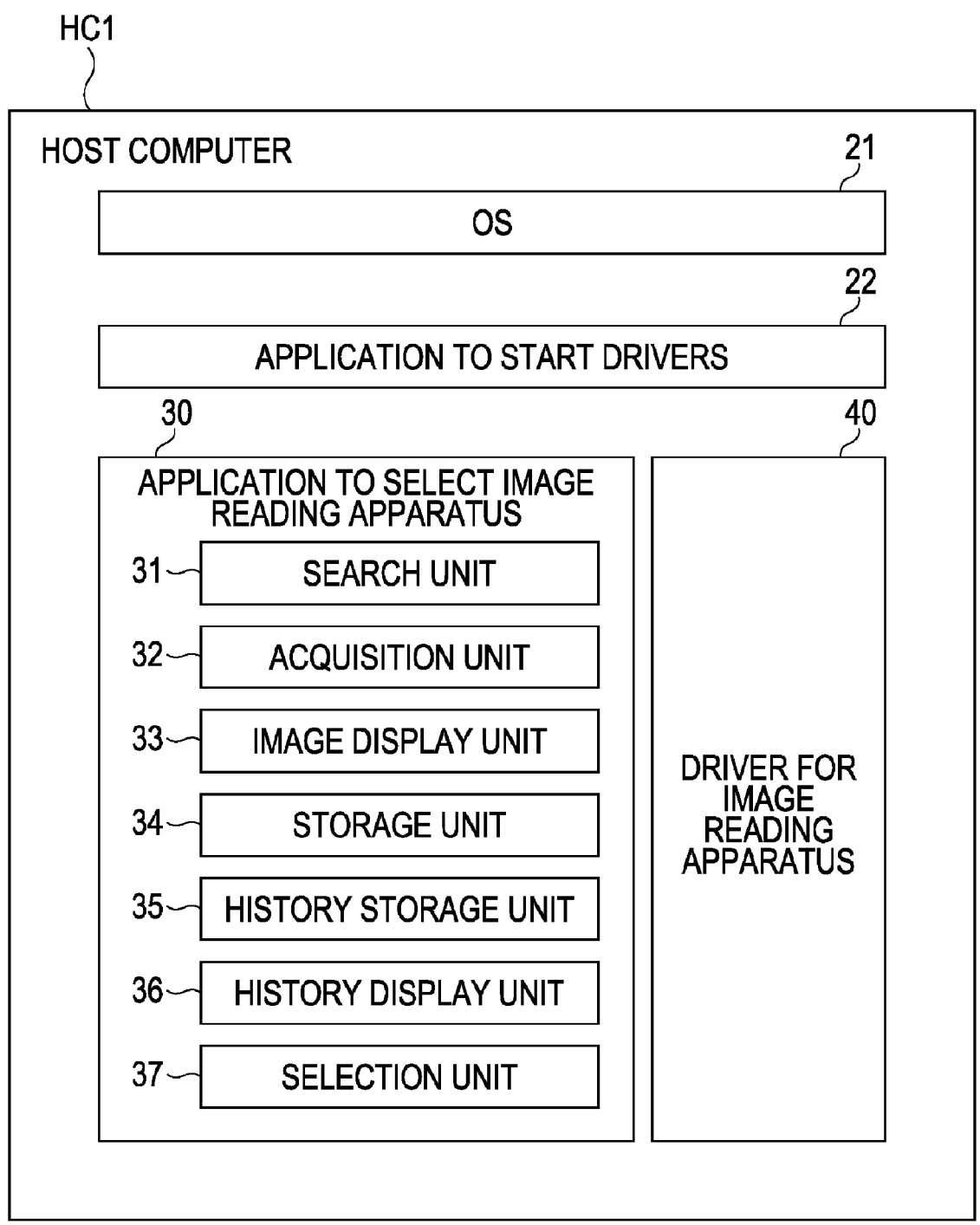
FIG. 2 is a diagram illustrating a system configuration of a host computer.

FIG. 2 illustrates a system configuration of the host computer HC1. As shown, the host computer HC1 includes an OS 21, an application 22 to start drivers, an application 30 to select an image reading apparatus, and a driver 40 for image reading apparatuses.

The host computer HC1, on which the application 30 is executed, includes a search unit 31 configured to search for image reading apparatuses, an acquisition unit 32, an image display unit 33, a storage unit 34, a history storage unit 35, a history display unit 36, and a selection unit 37.

The search unit 31 searches for image reading apparatuses R1 to R4 connected via the LAN 19. The acquisition unit 32 acquires preview images from image reading apparatuses. The image display unit 33 displays the preview images acquired by the acquisition unit. The storage unit 34 stores the preview images acquired by the acquisition unit for each image reading apparatus.

The history storage unit 35 stores a history as to an operation in which the driver is started and scan-and-read is executed using image reading apparatuses on the network. The history display unit 36 displays the history.

The selection unit 37 selects an image reading apparatus, which a user wants to use, based on the displayed preview images and history information.

The driver 40 is a driver that is executed by the host computer HC1 to control image reading apparatuses by issuing an operation command to image reading apparatuses usable to scan a document thereby to acquire image data.

Note that the image reading apparatuses R1 to R4 to which the driver 40 communicates are image reading apparatuses selected by the application 30. The application 30 displays information associated with the preview images and the history of the connected image reading apparatuses on the monitor 12. Based on the displayed information, a user selects one of the image reading apparatuses R1 to R4.

In the following explanation of the first embodiment, it is assumed that there are four image reading apparatuses R1 to R4 on the network. The image reading apparatuses R1 to R4 are respectively assigned MAC addresses "00.00.85.62.50.31", "00.00.85.62.50.32", "00.00.85.62.50.33", and "00.00.85.62.50.34".

Herein, let us further assume that a user wants to use the image reading apparatus R2. On the image reading apparatus R1, there is a document put by another user. There is no document put on the image reading apparatus R3. The image reading apparatus R4 is being used by another user.

Figure 3:
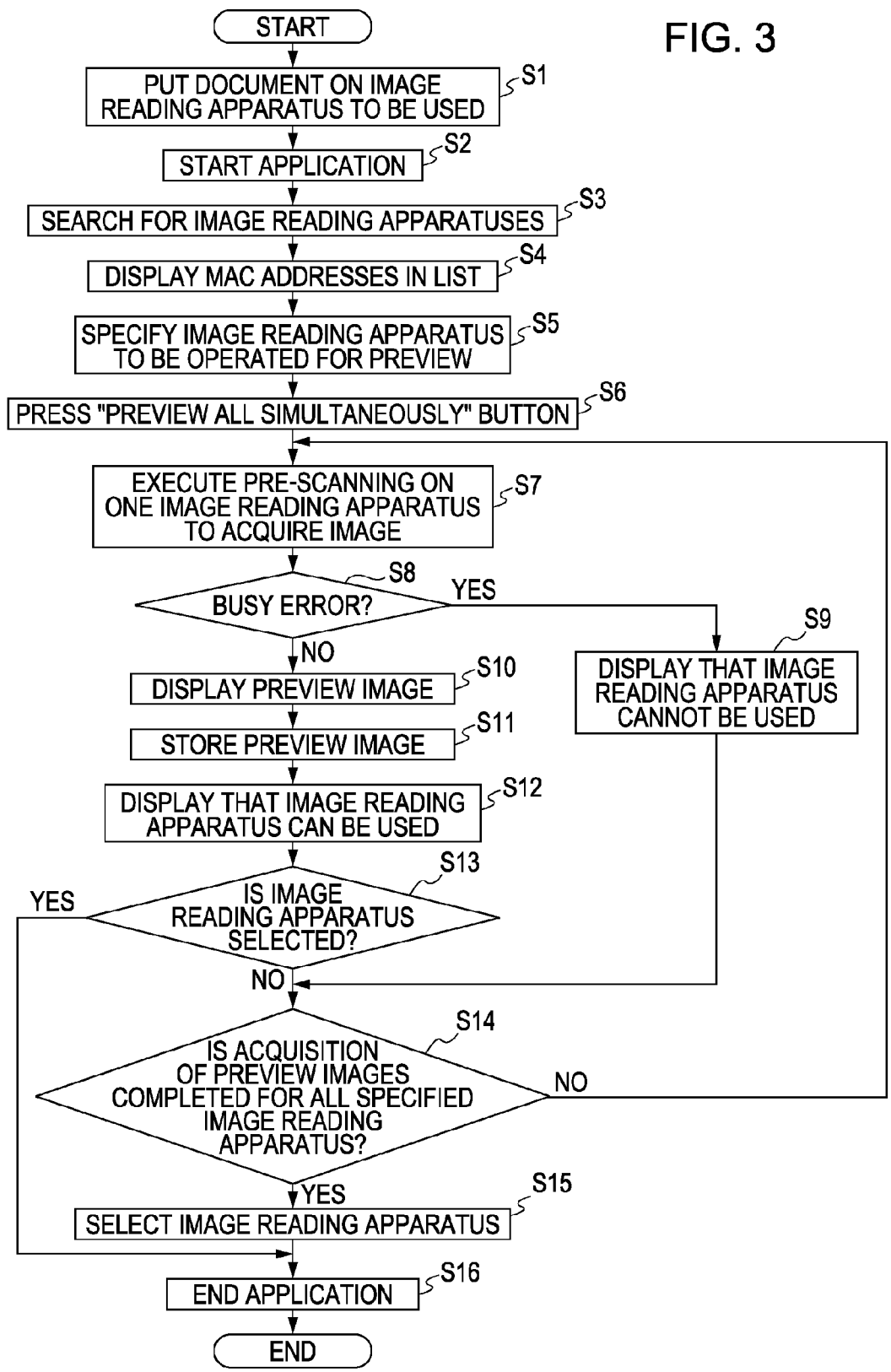
FIG. 3 is a flow chart illustrating an operation of an embodiment of the present invention.

FIG. 3 is a flow chart illustrating an operation according to the first embodiment of the invention.

First, the user puts a document on a document plate of the image reading apparatus R2 to be used (step S1) and starts the application 30 (step S2).

FIG. 4 is a diagram illustrating a user interface (UI) of the application 30.

The UI of the application 30 has a MAC address display area 51, a preview image display area 52, a check box 53, a status display area 54, a history display area 55, a check box 56, and a "PREVIEW ALL SIMULTANEOUSLY" button 57. The UI of the application 30 also has a "NEXT PREVIEW" button 58, an "APPLY IMMEDIATELY" button 59, and an "END" button 60.

The MAC address display area 51 is an area in which MAC addresses are displayed in the form of a list. In the preview image display area 52, preview images are displayed in the form of a list. The check box 53 specifies for each of the image reading apparatuses R1 to R4 whether to acquire a preview image. The status display area 54 is an area in which the status of each of the image reading apparatuses R1 to R4 is displayed. The history display area 55 is an area in which the history information is displayed.

The user selects an image reading apparatus to be used from the image reading apparatuses R1 to R4 by checking a corresponding check box 56. To execute the previewing, the user presses the "PREVIEW ALL SIMULTANEOUSLY" button 57. Note that in the description of the present invention, "acquiring preview images by performing a pre-scanning operation" is also expressed simply as "previewing" or "execution of previewing". To cancel the previewing being currently executed and to execute next previewing, the user presses the "NEXT PREVIEW" button 58. To immediately select one of the image reading apparatuses R1 to R4, the "APPLY IMMEDIATELY" button 59 is pressed. To end the application 30, the "END" button 60 is pressed.

If the application 30 is started, the search unit 31 searches for the image reading apparatuses R1 to R4 on the network (step S3) and displays the MAC addresses of the image reading apparatuses R1 to R4 on the network in the MAC address display area 51 (step S4). The user specifies, from the list of MAC addresses, image reading apparatuses from which to acquire preview images by checking check boxes 53 corresponding to MAC addresses displayed in the list (step S5) and presses the "PREVIEW ALL SIMULTANEOUSLY" button 57 (step S6). If the "PREVIEW ALL SIMULTANEOUSLY" button 57 is pressed, the preview image acquisition unit 32 acquires preview images by sequentially pre-scanning the image reading apparatuses corresponding to the specified MAC addresses (step S7).

In a case where no preview images are acquired and an error message indicating being in a busy state is returned from any of the image reading apparatuses R1 to R4 (step S8), the image reading apparatus that has returned the error message is likely to be used by another user or by another application. In this case, a message is displayed in the status display area 54 to indicate that the image reading apparatus in a busy state (step S9).

In the example shown in FIG. 4, a message "USED BY ANOTHER USER OR APPLICATION" is displayed in the status display area 54 of the MAC address "00.00.85.62.50.34". This reduces the probability that the image reading apparatus being used by another user or application is selected by mistake.

If a preview image is successfully acquired, the image display unit 33 displays the preview image in the preview image display area 52 corresponding to the MAC address (step S10). The storage unit 34 stores the acquired preview image in the host computer HC1 (step S11). If the preview image is acquired, a message is displayed in the status display area 54 to indicate that the image reading apparatus is in a usable state (step S12). In the example shown in FIG. 4, "USABLE" is displayed in the status display area 54 corresponding to the MAC addresses "00.00.85.62.50.31", "00.00.85.62.50.32", and "00.00.85.62.50.33".

The user determines whether the displayed preview image is of the document put in step S1. If the image is of the document put by the user, the user may check the check box 56 of the corresponding image reading apparatus to specify it from the image reading apparatuses R1 to R4. The user may further press the "APPLY IMMEDIATELY" button 59 to immediately select the specified image reading apparatus. In the case where the "APPLY IMMEDIATELY" button 59 is pressed in step S13, the "END" button 60 is pressed in step S16 to end the application 30.

In the selection of one of the image reading apparatuses R1 to R4, it is not necessary to wait for a preview image to be completely displayed. When a preview image is partly displayed, one of the image reading apparatuses R1 to R4 may be specified by checking a corresponding check box 56 and the "APPLY IMMEDIATELY" button 59 may be pressed to select it. This makes it possible to reduce the time necessary to specify a desired one of the image reading apparatuses R1 to R4. Even when the whole preview image is displayed, if the "APPLY IMMEDIATELY" button 59 is not pressed in step S13, then the previewing is performed for a next one of the image reading apparatuses R1 to R4 and a preview image acquired is displayed (step S14).

If the image reading apparatus that the user wants to use is at a late position in order of preview operation, it takes a long time to find the image reading apparatus the user wants to use. In view of the above, the "NEXT PREVIEW" button 58 is provided in the UI of the application 30 so that if the "NEXT PREVIEW" button 58 is pressed, the current previewing is canceled and previewing for a next image reading apparatus is started. In the present example, previewing for R1 is executed before previewing for R2 the user wants to use.

In the example shown in FIG. 4, document preview images for the image reading apparatuses R1 and R2 are displayed. No document is put on the image reading apparatus R3, and thus a white background image of the document plate is displayed as a preview image.

As described above, at a point of time at which the preview image for the image reading apparatus is fully or partly displayed, the user is allowed to select it. Instead, after a plurality of preview images have been acquired, the user may select an image reading apparatus to be used from the preview images.

In the latter case, based on the plurality of acquired and displayed preview images, the user specifies a desired one of the image reading apparatuses R1 to R4 by using the check bock 56 and then presses the "APPLY IMMEDIATELY" button 59. If the "APPLY IMMEDIATELY" button 59 is pressed, the image reading apparatus specified by the check box 56 is selected (step S15).

In the present example, it is assumed that the user wants to use the image reading apparatus R2 assigned the MAC address "00.00.85.62.50.32". In this case, if the check box 56 of the MAC address "00.00.85.62.50.32" is checked and the "APPLY IMMEDIATELY" button 59 is pressed, then the image reading apparatus R2 is selected. Thus, the user can explicitly select a right image reading apparatus to be used without having to know the correspondence between the image reading apparatuses R1 to R4 and their MAC addresses. After the image reading apparatus to be used is selected, the "END" button 60 of the application 30 is pressed to end the application 30 (step S16).

In the first embodiment, previewing is performed for image reading apparatuses on a one-by-one basis. In a second exemplary embodiment described below, in contrast, previewing is performed at the same time for a plurality of image reading apparatuses, and a plurality of acquired preview images are displayed at the same time.

Figure 5:
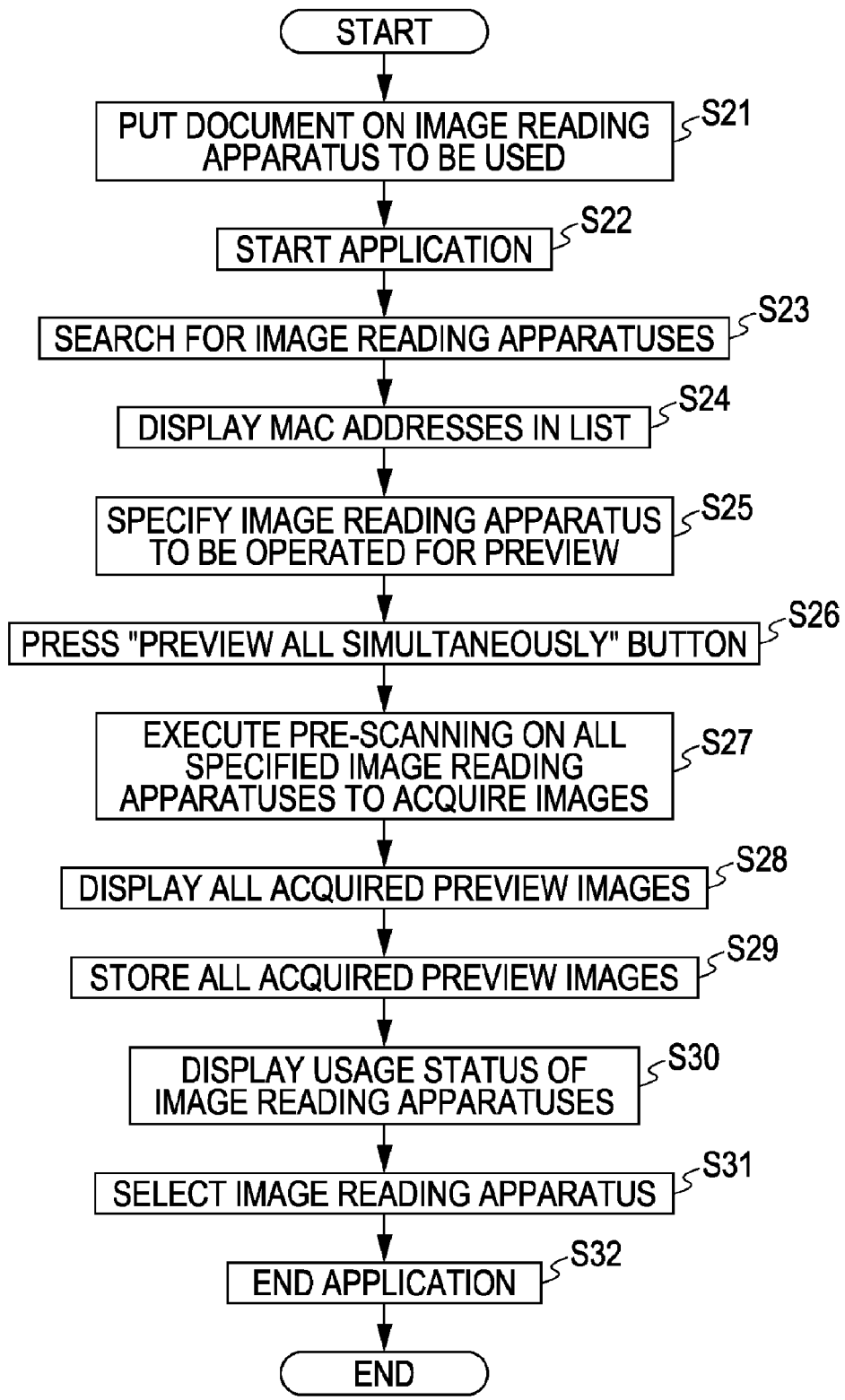
FIG. 5 is a flow chart illustrating an operation of previewing a plurality of image reading apparatuses at the same time.

FIG. 5 is a flow chart illustrating an operation of simultaneously performing previewing for a plurality of image reading apparatuses according to the second exemplary embodiment of the present invention.

First, a user puts a document on an image reading apparatus the user wants to use (step S21) and starts the application 30 (step S22) to search for image reading apparatuses (step S23). A list of MAC addresses of the image reading apparatuses R1 to R4 is displayed in the MAC address display area 51 (step S24). The user specifies image reading apparatuses for which previewing is to be performed to acquire preview images, from the list of MAC addresses corresponding to the image reading apparatuses R1 to R4 by checking check boxes 53 (step S25). The user then presses the "PREVIEW ALL SIMULTANEOUSLY" button 57 (step S26).

If the "PREVIEW ALL SIMULTANEOUSLY" button is pressed, pre-scanning is performed at the same time for all specified image reading apparatuses and preview images are acquired (step S27). All the acquired preview images are displayed in the preview image display area 52 (step S28). The acquired preview images are stored in the host computer HC1 for each of the image reading apparatuses R1 to R4 (step S29). Those of the image reading apparatuses R1 to R4 from which preview images have been acquired are indicated in such a manner that "USABLE" is displayed in the status display area. On the other hand, "USED BY ANOTHER USER OR APPLICATION" is displayed for those from which no preview images are acquired. As described above, based on the preview images acquired at the same time from a plurality of image reading apparatuses, the user selects an image reading apparatus to be used from the image reading apparatuses R1 to R4 (step S31). After the image reading apparatus is selected, the user ends the application 30 (step S32).

As described above, by performing previewing for a plurality of image reading apparatuses at the same time, it becomes possible to increase the possibility that an image reading apparatus to be used can be found in a shorter time.

In the first and second exemplary embodiments described above, an image reading apparatus to be used is selected from the image reading apparatuses R1 to R4 based on the preview images. In a third exemplary embodiment described below, in addition to preview images, history information is used in selecting an image reading apparatus.

The history information used in the present embodiment is, for example, as to the number of times that reading via the network was performed by using the driver 40, an image acquired in the last scanning operation, a date/time at which the last scanning operation was performed. The application 30 stores the history information in the history storage unit 35, and the history display unit 36 displays the history information in the history display area 55. Based on the history information, the user selects an image reading apparatus.

In the example of the user interface of the application 30 shown in FIG. 4, the date/time when the last scanning via the network using the scanner driver was performed is indicated in "LAST USED DATE/TIME" fields.

An image reading apparatus R3 assigned an MAC address "00.00.85.62.50.33" has not been used by the user in the past, and thus "NOT USED BEFORE" is displayed in a corresponding "LAST USED DATE/TIME" field. Such image reading apparatuses that have not been used by the user in the past are likely to be for exclusive use by another user or be at a remote location, and thus such image reading apparatuses are not good candidates for use in most cases.

FIG. 6 is a diagram illustrating a warning dialogue displayed when a new image reading apparatus is specified to be used.

In a case where an image reading apparatus that has not been used before is specified by a user and the "APPLY IMMEDIATELY" button 59 is pressed, there is a possibility that the image reading apparatus is selected by mistake. Thus, the warning dialogue such as that shown in FIG. 6 is displayed. It is also useful to provide information as to the usage frequency to the user so that the user is allowed to select an image reading apparatus that is frequently used by the user.

When preview images are acquired sequentially for image reading apparatuses on a one-by-one basis as in the first embodiment, history information may be referred to thereby making it possible to acquire preview images in descending order of usage frequency from the image reading apparatuses R1 to R4. This makes it possible to find a desired image reading apparatus in a shorter time.

Even in a case where there are a plurality of image reading apparatuses with similar performance on a network, preview images and history information used in the first through third embodiments described above can be measures based on which to make a selection.

Thus, the user can easily select an image reading apparatus to be used via the procedure described above. After that, by using the driver 40, the user can acquire desired image data from the image reading apparatus selected from the image reading apparatuses R1 to R4.

The driver of the image reading apparatus generally has a preview screen in the UI so that a user is allowed to input an instruction as to image processing such as trimming or correcting via the preview screen. According to the input instruction, actual scanning is performed to acquire an image.

In the present embodiment, as described above, the previewing has already been performed by the application 30 for the image reading apparatuses R1 to R4. Therefore, the driver 40 does not need to acquire the preview image again from the selected one of the image reading apparatuses R1 to R4.

Instead, the driver 40 reads the preview image corresponding to the selected image reading apparatus from the preview images stored in the preview image storage unit 34 and uses it as the read preview image. This makes it unnecessary to take an additional time to acquire the preview image in the process associated with the driver.

In the first through third embodiments described above, an image reading apparatus is selected from the image reading apparatuses R1 to R4 connected to the network. Alternatively, an image reading apparatus may be selected from image reading apparatuses connected via a USB connection, an IEEE1394 connection, or connections according to other connection techniques.

An information processing method may be realized by steps performed by respective units described in any embodiment described above. Note that any such method falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-105789 filed Apr. 15, 2008, which is are hereby incorporated by reference herein in its entirety.

What is claimed is:

1. A selection method, in an information processing apparatus connected to a plurality of image reading apparatuses, for making a selection from the plurality of image reading apparatuses, comprising the steps of:
   searching for the connected image reading apparatuses;
   performing a first displaying process to display the image reading apparatuses detected in the searching step;
   performing pre-scanning to acquire preview images from the respective image reading apparatuses detected in the searching step by controlling the image reading apparatuses;
   performing a second displaying process to display the preview images acquired in the pre-scanning step in such a manner that the preview images are correlated with the image reading apparatuses displayed in the first displaying process; and
   selecting an image reading apparatus based on the preview images displayed in the second displaying process.

2. The selection method according to claim 1 further comprising the steps of:
   performing a first storing process to store a history as to actual scanning performed by each image reading apparatus; and
   performing a third displaying process to display the history stored in the first storing process in such a manner that the history is correlated with the image reading apparatuses displayed in the first displaying process,
   wherein the selection step includes selecting one image reading apparatus based on information provided in the second displaying process and the third displaying process.

3. The selection method according to claim 1, further comprising the steps of:
   performing a second storing process to store the preview images acquired in the pre-scanning step; and
   setting a reading condition associated with the actual scanning, using the preview images stored in the second storing process.

4. The selection method according to claim 1, wherein in the selection step, applying of the selection is allowed before the preview image is fully displayed in the second displaying process.

5. The selection method according to claim 1, wherein the pre-scanning step is performed for an image reading apparatus specified from the image reading apparatuses displayed in the first displaying process.

6. The selection method according to claim 1, wherein the pre-scanning step is performed so as to simultaneously acquire preview images from the plurality of image reading apparatuses displayed in the first displaying process.

7. The selection method according to claim 1, wherein the pre-scanning step further includes the step of, in a case where no preview image is acquired by controlling an image reading apparatus, performing a fourth displaying process to display information indicating that no preview image is acquired.

8. The selection method according to claim 1 further comprising the step of:
   issuing an instruction to start a next previewing operation,
   wherein in the pre-scanning step, if the instruction is issued in the instruction issuing step before pre-scanning for an image reading apparatus is completed, then the pre-scanning is ended and pre-scanning for a next image reading apparatus is started.

9. The selection method according to claim 2 further comprising the step of, in a case where there is no history information stored in the first storing step as to a selected image reading apparatus, performing a fifth displaying process to display information indicating that a selected image reading apparatus is going to be used for the first time.

10. The selection method according to claim 2 wherein in the pre-scanning step, the history information stored in the first storing step is referred to, and the pre-scanning is performed sequentially for the image reading apparatuses in descending order of usage frequency.

11. A non-transitory computer readable storage medium containing computer-executable instructions for controlling an information processing apparatus connected to a plurality of image reading apparatuses to make a selection from the plurality of image reading apparatuses, the storage medium comprising:
   computer-executable instructions for searching for the connected image reading apparatuses;
   computer-executable instructions for performing a first displaying process to display the image reading apparatuses detected in the searching step,
   computer-executable instructions for performing pre-scanning to acquire preview images from the respective image reading apparatuses detected in the searching step by controlling the image reading apparatuses,
   computer-executable instructions for performing a second displaying process to display the preview images acquired in the pre-scanning step in such a manner that the preview images are correlated with the image reading apparatuses displayed in the first displaying process, and
   computer-executable instructions for selecting an image reading apparatus based on the preview images displayed in the second displaying process.

12. An image processing apparatus connected to a display and a plurality of image reading apparatuses, the image processing apparatus being configured to execute a driver to control the image reading apparatuses and execute an application to select an image reading apparatus to be used from the plurality of image reading apparatuses, the image processing apparatus comprising:

a searching unit configured to search for the connected image reading apparatuses;

a first displaying unit configured to display the image reading apparatuses detected by the searching unit;

a second displaying unit configured to acquire preview images from the respective image reading apparatuses detected by the searching unit by controlling the image reading apparatuses by using a driver and display the acquired preview images in such a manner that the preview images are correlated with the image reading apparatuses displayed by the first displaying unit; and a selecting unit configured to select an image reading apparatus based on the preview images displayed by the second displaying unit.

* * * * *